United States Patent [19]

Wakata et al.

[11] Patent Number: 4,837,773
[45] Date of Patent: Jun. 6, 1989

[54] DISCHARGE EXCITATION TYPE SHORT PULSE LASER

[75] Inventors: Hitoshi Wakata; Mitsuo Inoue; Yukio Sato; Kenyu Haruta; Haruhiko Nagai, all of Hyogo, Japan

[73] Assignee: Mitsubishi Denki Kabushiki Kaisha, Tokyo, Japan

[21] Appl. No.: 267,629

[22] Filed: Oct. 31, 1988

Related U.S. Application Data

[63] Continuation of Ser. No. 16,037, Feb. 18, 1987, abandoned.

[30] Foreign Application Priority Data

Feb. 18, 1986 [JP] Japan .................................. 61-31893
Feb. 18, 1986 [JP] Japan .................................. 61-31894

[51] Int. Cl.$^4$ ............................................. H01S 3/097
[52] U.S. Cl. ........................................ 372/86; 372/38; 372/82; 372/83
[58] Field of Search ........................ 372/38, 81-83, 372/86, 87, 25

[56] References Cited

U.S. PATENT DOCUMENTS 4,105,952 8/1978 Tulip ................................... 372/38
4,612,643 9/1986 Long et al. ......................... 372/38
4,630,277 12/1986 Cirkel et al. ....................... 372/86

FOREIGN PATENT DOCUMENTS 0219340 2/1985 Fed. Rep. of Germany ........ 372/25
0090481 5/1986 Japan ................................. 372/86

OTHER PUBLICATIONS

D. B. Cohn; "CO$_2$ Laser Excited by Preionized Transverse Discharge Through a Dielectric"; Appl. Phys. Lett., 37(9), 1 Nov. 1980; pp. 771-773.

Primary Examiner—William L. Sikes
Assistant Examiner—B. R. R. Holloway
Attorney, Agent, or Firm—Sughrue, Mion, Zinn, Macpeak & Seas

[57] ABSTRACT

A discharge excitation type short pulse laser device is provided with a preliminary ionization circuit, the effeciency of preliminary ionization of which is remarkably improved. The laser device comprises a main discharge circuit including first and second main electrodes which are confronted with each other in a laser medium, main discharge capacitor means for storing energy for main discharge, and a discharge starting high voltage switch; and a preliminary ionization circuit connected to said high voltage switch, said preliminary ionization circuit including a discharging gap for preliminary ionization, a preliminary ionization capacitor and an inductance.

10 Claims, 4 Drawing Sheets

DISCHARGE EXCITATION TYPE SHORT PULSE LASER

This is a continuation, of application Ser. No. 07/016,037 filed Feb. 18, 1987, which is abandoned.

BACKGROUND OF THE INVENTION

The present invention relates to laser devices, and more particularly to a discharge excitation type short pulse laser device in which an electric discharge is caused in a variety of gases such as atomic gases, molecular gases, ionic gases, gaseous mixtures of them, metal vapors and vapors from volatile liquids for excitation to thereby produce a short pulse laser beam.

A conventional discharge excitation type short pulse laser device of this type is as shown in FIG. 1 In FIG. 1, reference numeral 1 designates a capacitor for storing energy for a main discharge; 2, a peaking capacitor; 3, a charging inductance; 4, a high voltage switch for starting an electric discharge comprising a thyratron; 5, a first main electrode arranged in a laser medium 14; 6, a second main electrode which is also arranged in the laser medium 14 so as to be spaced a predetermined distance from the first main electrode 5; 7, a main electric discharge which takes place between the two main electrodes 5 and 6; 8, a discharge gap for auxiliary ionization connected in series to the peaking capacitor 2; 9, ultraviolet rays formed in the discharge gap 8; and 10, a high voltage generating unit.

In the discharge excitation type short pulse laser device thus organized, after the capacitor 1 has been charged by the high voltage from the high voltage generating unit 10 through the charging inductance 3, the high voltage switch 4 is turned on to complete the loop of the capacitor 1, the peaking capacitor 2 and the high voltage switch 4, so that the peaking capacitor 2 is quickly charged by the pulse voltage. As shown in FIG. 1, the peaking capacitor 2 is connected in parallel to the first and second main electrodes 5 and 6. Therefore, as the charging of the peaking capacitor 2 progresses to increase the potential difference between the main electrodes 5 and 6, the dielectric breakdown of the laser medium 14 between the main electrodes 5 and 6 is caused, so that the main discharge 7 occurs therebetween. This circuit is so called "a capacitance shift type circuit", and it is extensively employed as a short pulse laser device as well as a conventional "LC inversion type circuit".

On the other hand, in a sort pulse laser device such as an ordinary "TEA CO$_2$ laser" or "excimer laser", its operating pressure is high, several atmospheres for instance, and therefore the above-described electric discharge is liable to converge; that is, the laser output is liable to decrease. In order to overcome this difficulty by providing a spatially uniform main discharge, a method has been employed in which a preliminary electric discharge is carried out to uniformly scatter discharging electron seeds in advance in the area where the main discharge occurs. In the laser device as shown in FIG. 1, the preliminary ionization is carried out by the ultraviolet rays 9 which is produced in the discharging gap 8 connected in series to the peaking capacitor 2.

With the above described first example of the conventional discharge excitation type short pulse laser device shown in FIG. 1, the amount of preliminary ionization depends on the circuit for performing the main discharge, and therefore it is difficult to adjust the time when the amount of preliminary ionization becomes maximum. Furthermore, since a large quantity of electric charges passes through the discharging gap, an intense spark discharge occurs in the discharge gap. As a result, not only the energy but the electrodes are consumed uneconomically, and further impure gases are produced.

FIG. 2 shows a second example of the conventional discharge excitation type short pulse laser device in which similarly as in the laser device shown in FIG. 1, the preliminary ionization is performed to make the main discharge uniform. In FIG. 2, those components which have been previously described with reference to FIG. 1 have therefore been similarly numbered.

With such a laser device as shown in FIG. 2, a second main electrode 6 has a number of holes, and a dielectric material 15 is laid between the porous main electrode 6 and an auxiliary electrode 16 to form a capacitor which is connected in parallel to peaking capacitor 2.

When, in the laser device of FIG. 2, the high voltage switch 4 is turned on, the voltage across the peaking capacitor 2, i.e., between the second main electrode 6 and the auxiliary electrode 16, rises as shown in FIG. 7(A) similarly as in the case of the laser device of FIG. 1.

On the other hand, a current whose waveform is as shown in FIG. 7(B) flows from the capacitor 1 to the peaking capacitor 2 and the capacitor made up of the second electrode 6 and the auxiliary electrode 16, to charge these capacitors. The rate of flow of the current depends on the composite capacitance of the capacitor 1, the peaking capacitor 2 and the capacitor made up of the second main electrode 6 and the auxiliary electrode 16, and on the stray inductance of the circuit. And the current oscillates in each 50 to 100 ns periods as shown in FIG. 7(c). In the porous region of the second main electrode 6, a creeping discharge is caused by the above-described charging current resulting in the preliminary ionization.

In the conventional laser device shown in FIG. 2, similarly as in the case of the conventional laser device of FIG. 1, the preliminary ionization depends mainly on the circuit of the main discharge, and therefore it is difficult to adjust the time when the amount of preliminary ionization becomes maximum, and the electrons formed by the preliminary ionization may disappear. Therefore, a smaller part of the number of electrons formed by the preliminary ionization is used for the main discharge. In addition, the preliminary ionization is carried out only once. Accordingly, the electrons formed by the preliminary ionization is liable to become nonuniform in distribution. As a result, it becomes difficult to make the main discharge uniform, resulting in the decrease of the laser output.

SUMMARY OF THE INVENTION

Accordingly, an object of this invention is to eliminate the above-described difficulties accompanying conventional discharge excitation type short pulse laser devices.

More specifically, an object of the invention is to provide a discharge excitation type short pulse laser device high in durability, in which adjustment of the time when the amount of preliminary ionization becomes maximum can be performed accurately, the preliminary ionization is achieved with high efficiency, and the main discharge is stably carried out.

The discharge excitation type short pulse laser device according to the present invention comprises a preliminary ionization circuit which is formed by connecting a series circuit of a capacitor and an inductance, which are used for setting a time constant, between the discharging gap and the high voltage side of the device. The time constant of the circuit and the current flowing therethrough can be controlled as required.

In the discharge excitation type short pulse laser device according to the invention, the time when the number of preliminary ionization electrons becomes maximum and the oscillation period can be adjusted by the added preliminary circuit. Therefore, in the laser device of the invention, the number of preliminary ionization electrons for the main discharge is increased, and the uniformity of the main discharge is improved. In addition, since only the number of electrons required for generation of the main discharge is supplied, the efficiency of the preliminary ionization is remarkably improved. Further, the number of electrons passing through the discharging gap for preliminary ionization is decreased. This results in the extension of the service life of the laser device.

DETAILED DESCRIPTION OF THE PREFERRED EMBODIMENTS

Figure 1:
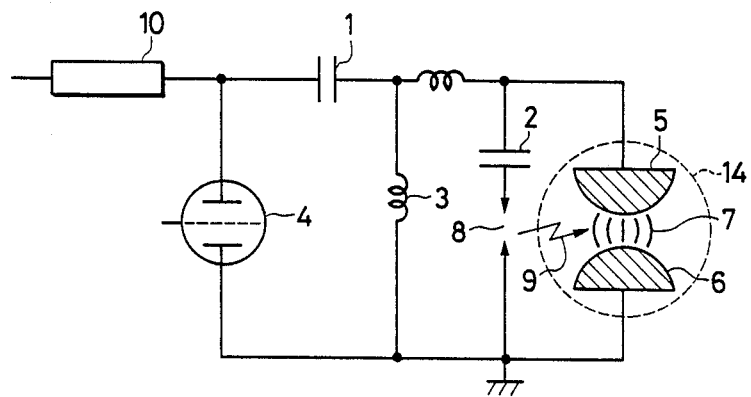
FIG. 1 is a circuit diagram showing one example of a conventional discharge excitation type short pulse laser device
Figure 2:
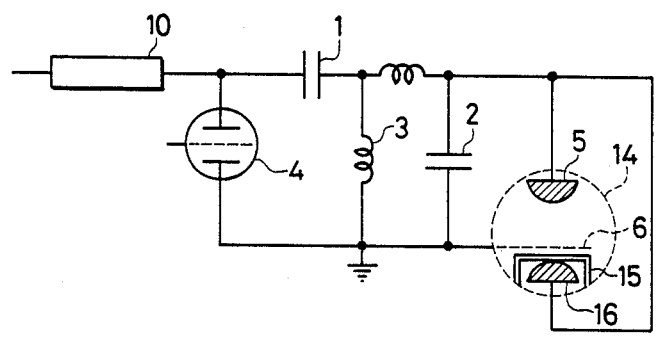
FIG. 2 is a circuit diagram showing another example of the conventional discharge excitation type short pulse laser device.
Figure 3:
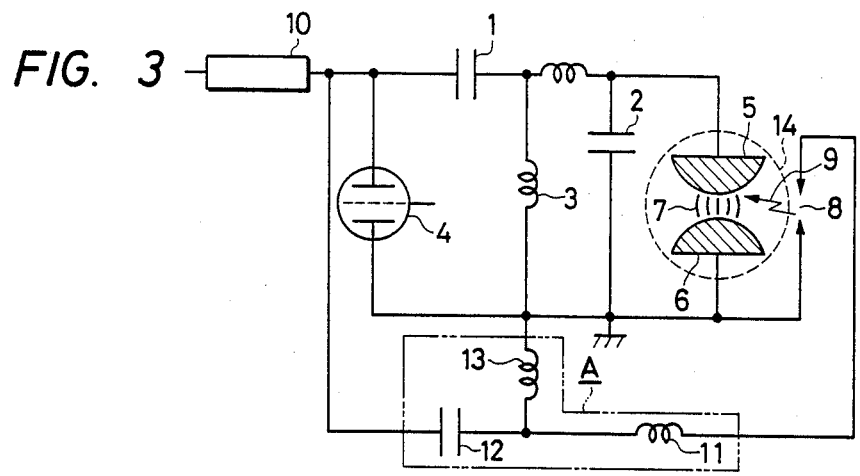
FIG. 3 is a circuit diagram showing a first example of a discharge excitation type short pulse laser device according to the present invention.

A first example of a discharge excitation type short pulse laser device according to the present invention is as shown in FIG. 3, in which those components which have been previously described with reference to FIG. 1 are therefore designated by the same reference numerals.

In FIG. 3, reference character A designates an oscillation period adjusting circuit used only for preliminary ionization (hereinafter referred to as "a preliminary ionization circuit", when applicable) which is made up of a time constant setting capacitor 12, an inductance 11 and an inductance 13 for charging the capacitor 12. These circuit elements 11, 12 and 13 are connected between the discharging gap 8 and the high voltage side of the laser device.

In the laser device thus organized, first the capacitor 1 is charged by the high voltage through the charging inductance 3, and then the high voltage switch 4 is turned on to complete the loop consisting of the capacitor 1, the peaking capacitor 2 and the high voltage switch 4, so that the peaking capacitor 2 is quickly charged by the pulse voltage. Therefore, the voltage between the first and second main electrodes 5 and 6 increases. Simultaneously, a circuit which comprises the high voltage switch 4, the capacitor 12, the inductance 11 and the discharge gap 8, is formed as the aforementioned preliminary ionization circuit A. As a result, the voltage of the capacitor 12 causes electric discharge to take place in the discharging gap 8, so that ultraviolet rays are produced. Thus, the preliminary ionization has been achieved.

Figure 4A:
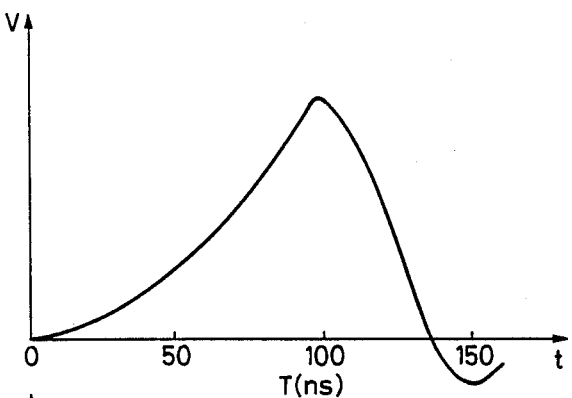
FIGS. 4(A), 4(B) and 4(C) are graphical representations for a description of the operation of the first example of the discharge excitation type short pulse laser device shown in FIG. 3.
Figure 4B:
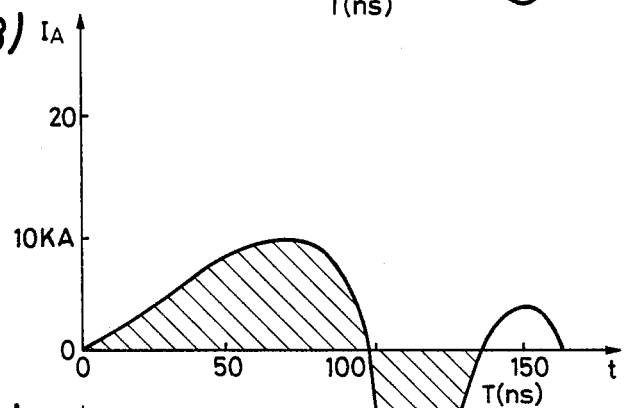
Figure 4C:
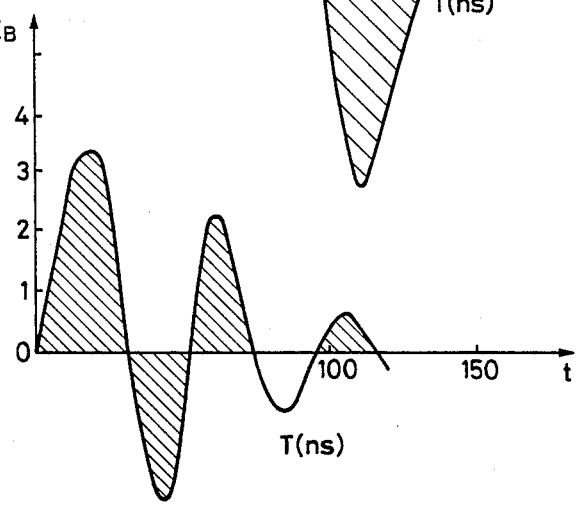
Figure 7A:
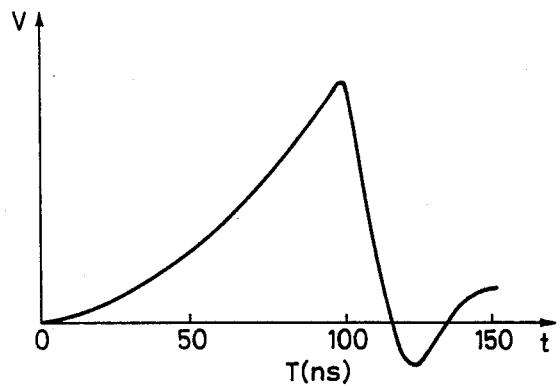
FIGS. 7(A), 7(B) and 7(C) are graphical representations for a description of the operation of the conventional laser device shown in FIG. 2.
Figure 7B:
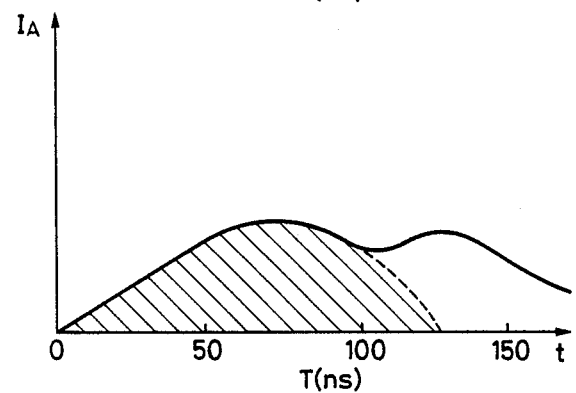
Figure 7C:
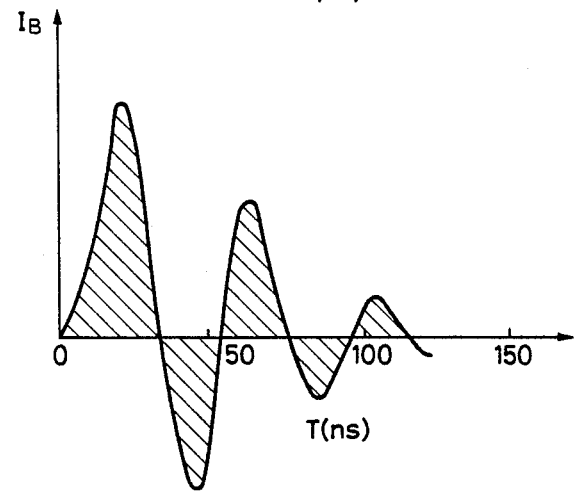

The operation of the laser device will become more apparent from FIGS. 4(A), 4(B) and 4(C). FIG. 4(A) shows the variation of the voltage between the main electrodes 5 and 6. In FIG. 4(A), the voltage reaches the peak in about 100 ns, and it falls abruptly by the dielectric breakdown of the laser medium. FIG. 4(B) shows the variation of the current in the peaking capacitor 2. More specifically, in FIG. 4(B), a current of 10 kA flows when the capacitor is charged, and a current of 20 to 30 kA flows in the opposite direction when it is discharged. In the conventional laser device, the current flows, as it is, in the discharging gap for preliminary ionization, thus causing the above-described difficulties. FIG. 4(C) shows the variation of the current flowing in the discharging gap 8. By decreasing the capacitance of the capacitor 12, the oscillation period can be made smaller than that of the waveform shown in FIG. 4(A), and the peak value of the current can be made small. As a result, even if the peak value of the current is decreased to one third or less, the preliminary ionization can be accomplished to cause the uniform main discharge.

In the above-described laser device, the intense electric discharge is caused to take place in the vicinity of the main discharge to achieve the preliminary ionization. However, if another capacitor is further connected in series to the discharging gap 8, the peak value of the current can be further decreased. Moreover, in the above-described laser device, the series circuit of the capacitor 12 and the inductance 11 is connected between the discharging gap 8 and the high voltage side of the device. However, if the discharging gap 8 is connected through a pulse forming line such as a coaxial cable to the high voltage side, then the rise of the current can be made steep and can be caused to occur at any desired time, which further improves the effect of the preliminary ionization.

Figure 5:
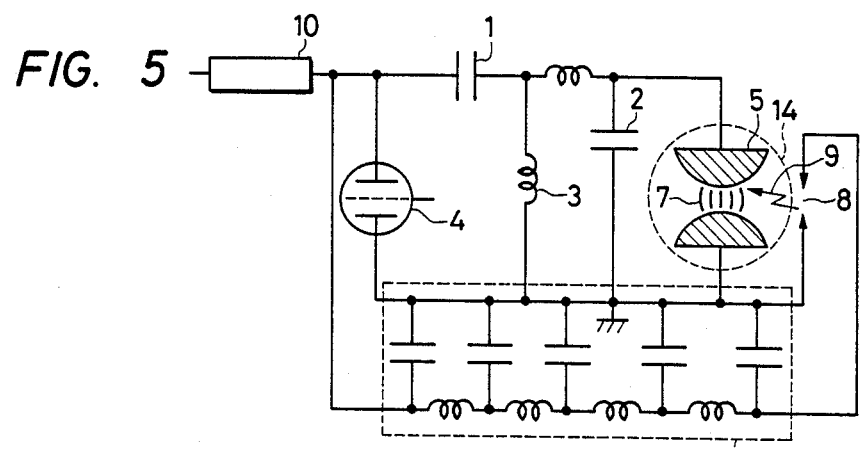
FIG. 5 is a circuit diagram showing a second example of the discharge excitation type short pulse laser device according to the invention.

FIG. 5 shows a second example of the discharge excitation type short pulse laser device according to the invention, which employs the aforementioned pulse forming line 20.

A third example of the discharge excitation type short pulse laser device according to the invention will be described with reference to FIG. 6, in which those components which have already been described with reference to the first and second examples are therefore designated by the same reference numerals.

Figure 6:
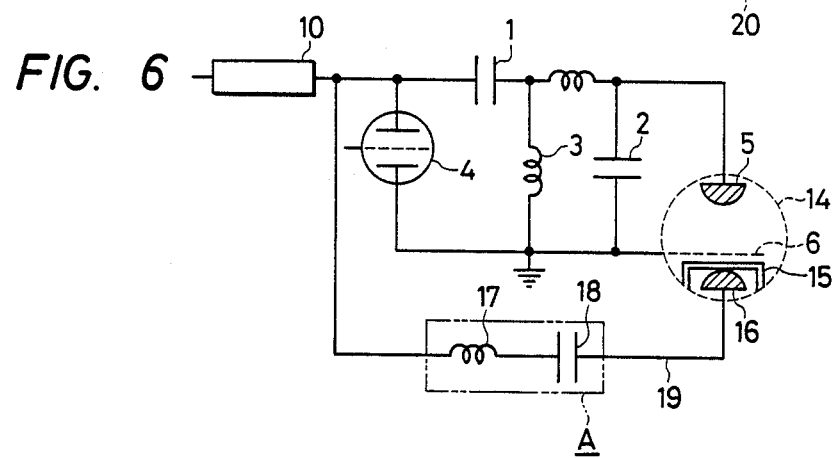
FIG. 6 is a circuit diagram showing a third example of the discharge excitation type short pulse laser device according to the invention.

In FIG. 6, reference character A designates a preliminary ionization circuit for oscillation period control, which comprises a series circuit of an inductance 17 and a capacitor 18 which are used for setting a time constant, and reference numeral 19 designates the connecting point of the capacitor 18 and the auxiliary electrode 16.

In the laser device thus organized, first the capacitor 1 is charged by the high voltage through the inductance 3, and then the high voltage switch 4 is turned on to complete the loop of the capacitor 1, the peaking capacitor 2 and the high voltage switch 4, so that the peaking capacitor 2 is quickly charged by the pulse voltage. As the voltage developed across the first and second main electrodes 5 and 6, a loop of the inductance 17, the capacitor 18, the auxiliary electrode 16, the dielectric 15, the second main electrode 6 and the high voltage switch 4 is completed, and accordingly the preliminary ionization circuit A is completed. As a result, the time constant setting capacitor 18 and the capacitor formed by the main electrode 6, the dielectric 15 and the auxiliary electrode 16 are discharged, so that a creeping electric discharge occurs in each of the pores of the second main electrode 6 to achieve the preliminary ionization.

The oscillation period of the preliminary ionization circuit A is defined by $$2\pi \sqrt{L \cdot C}$$

where L is the inductance of the preliminary ionization circuit, and C is the capacitance.

In general, the amount of charge necessary for the preliminary ionization can be of the order of 1% of that required for the main discharge. Therefore, the capacitance C can be set to a small value, and the oscillation period of the preliminary ionization circuit can be less than 1/10 of the oscillation period of the main discharge circuit.

In the above-described example of the laser device, the preliminary ionization takes place twice before the occurrence of the main discharge so that the preliminary ionization is improved in uniformity. This results in that the transition of the main discharge into arc discharge is suppressed and the main discharge is thus maintained uniform.

In the above-described third example of the laser device according to the invention, the inductance 17 and the capacitor 18, which are used for setting the time constant, are provided in the preliminary ionization circuit A, to control the time required for the number of preliminary ionization electrons to reach the maximum value and the oscillation period. However, if the high voltage side of the high voltage switch 4 is connected to the auxiliary electrode 16 through the pulse forming line 20 such as a coaxial cable which is employed in the second example of the laser device shown in FIG. 5, then changing the length of the pulse forming line, the same control can be obtained, i.e., the current pulse having a steep rise can be obtained.

Instead of the time constant setting inductance, a magnetic saturation switch for instance may be employed. In this case, the preliminary ionization starting timing is adjusted by its large inductance before the switch is saturated. Further, when the creeping discharge current increases, it is saturated and the inductance is thus decreased to accelerate the increase of the current. Consequently, the maximum number of preliminary ionization electrons can be increased.

If the connecting point 19 of the capacitor 18 and the auxiliary electrode 16 is grounded through a high resistance or a high inductance, then only the variation of voltage can be applied between the auxiliary electrode 16 and the second electrode 2 with the same effect.

As described above, according to the present invention, the discharge excitation type short pulse laser device comprises a preliminary ionization circuit so that the oscillation period and the time when the maximum number of preliminary ionization electrons is obtained, can be adjusted. Therefore, in the laser device of the invention, the number of preliminary ionization electrons for the main discharge is increased, and the uniformity of the main discharge is improved. In addition, since only the minimum number of electrons required for generation of the main discharge is supplied, the efficiency of the preliminary ionization is remarkably improved. Further, the number of electrons passing through the discharging gap for preliminary ionization is decreased, resulting in the extension of the service life of the laser device.

What is claimed is:

1. A discharge excitation type short pulse laser device comprising:
   a main discharge circuit including first and second confronting main electrodes in a laser medium, a discharge starting high voltage switch, main discharge capacitor means coupled to said switch for storing energy from a voltage supply and for producing a voltage pulse upon closure of said switch, and peaking capacitor means responsive to said voltage pulse and connected in parallel with said confronting main electrodes for causing breakdown of said laser medium in response to the charging of the peaking capacitor means by said voltage pulse; and
   a preliminary ionization circuit independent of the main discharge capacitor means and the peaking capacitor means and connected to and receiving signals from said high voltage switch and said voltage supply, said preliminary ionization circuit including a discharging gap for preliminary ionization of said laser medium, and a signal generating circuit coupled to said voltage supply for producing a signal to break down said discharging gap, the current produced by said signal generating circuit being independent of the current produced by said discharge capacitor means.

2. A discharge excitation type short pulse laser device as claimed in claim 1, in which said signal generating circuit comprises a pulse forming line.

3. A discharge excitation type short pulse laser device as claimed in claim 1, in which said second main electrode is a perforated electrode, and wherein said discharging gap comprises a gap between an auxiliary electrode and said perforated electrode, a dielectric member being positioned between said perforated electrode and auxiliary electrode.

4. A discharge excitation type short pulse laser device as claimed in claim 1 in which said signal generating circuit comprises an inductance and a capacitance forming a time constant circuit.

5. A discharge type short pulse laser device as claimed in claim 1, wherein said signal generating circuit comprises a two-terminal input connected across said high voltage switch and a two-terminal output connected across said discharging gap.

6. A discharge type short pulse laser device as claimed in claim 2, wherein said pulse forming line comprises an input end connected across said switch and an output end connected across said discharging gap.

7. A discharge type short pulse laser device as claimed in claim 1, wherein an input of said signal generating circuit is connected across said high voltage switch and an output of said signal generating circuit is connected across said discharging gap.

8. A discharge type short pulse laser device as claimed in claim 7, wherein said signal generating circuit consists of a coaxial cable having said input and output.

9. A discharge type short pulse laser device as claimed in claim 4, wherein said inductance and said capacitance are connected in series between a terminal of said high voltage switch and an electrode forming said discharging gap.

10. A discharge type short pulse laser device as recited in claim 1, wherein said signals from said high voltage switch and said voltage supply are electric power signals providing power for generating said preliminary ionization of said laser medium.

* * * * *